United States Patent
Ueshima

(10) Patent No.: US 8,634,526 B2
(45) Date of Patent: Jan. 21, 2014

(54) ADVERTISING-EFFECTIVENESS DETERMINATION METHOD, ADVERTISING-EFFECTIVENESS DETERMINATION SYSTEM, AND ADVERTISING-EFFECTIVENESS DETERMINATION PROGRAM

(75) Inventor: Yasushi Ueshima, Tokyo (JP)

(73) Assignee: Comsquare Co., Ltd., Tokyo (JP)

(*) Notice: Subject to any disclaimer, the term of this patent is extended or adjusted under 35 U.S.C. 154(b) by 606 days.

(21) Appl. No.: 12/699,008

(22) Filed: Feb. 2, 2010

(65) Prior Publication Data

US 2010/0135475 A1 Jun. 3, 2010

Related U.S. Application Data

(63) Continuation of application No. PCT/JP2007/065352, filed on Aug. 6, 2007.

(51) Int. Cl.
*H04M 15/00* (2006.01)
*H04M 1/64* (2006.01)

(52) U.S. Cl.
USPC ............ 379/114.13; 379/88.17; 379/265.12; 379/93.25; 379/127.01

(58) Field of Classification Search
USPC .............. 379/265.12, 114.13, 91.01, 93.25, 379/142.06, 265.09, 88.17, 127.01
See application file for complete search history.

(56) References Cited

U.S. PATENT DOCUMENTS

| | | | | |
|---|---|---|---|---|
| 6,101,486 A | * | 8/2000 | Roberts et al. | 705/14.66 |
| 8,027,878 B2 | * | 9/2011 | Wong et al. | 705/14.73 |
| 8,175,939 B2 | * | 5/2012 | Howe et al. | 705/35 |
| 8,209,225 B2 | * | 6/2012 | Altberg et al. | 705/14.73 |
| 2002/0191762 A1 | * | 12/2002 | Benson | 379/133 |
| 2004/0264660 A1 | * | 12/2004 | McCullough et al. | 379/114.13 |
| 2005/0074102 A1 | | 4/2005 | Altberg et al. | |
| 2006/0159063 A1 | * | 7/2006 | Kumar | 370/352 |
| 2006/0271438 A1 | * | 11/2006 | Shotland et al. | 705/14 |
| 2006/0294025 A1 | | 12/2006 | Mengerink | |
| 2007/0038507 A1 | * | 2/2007 | Kumar | 705/14 |
| 2007/0230674 A1 | * | 10/2007 | Altberg et al. | 379/114.01 |
| 2007/0244752 A1 | * | 10/2007 | Bayne | 705/14 |
| 2007/0274483 A1 | * | 11/2007 | Shapiro | 379/114.12 |

(Continued)

FOREIGN PATENT DOCUMENTS

| | | |
|---|---|---|
| JP | 2005-115945 | 4/2005 |
| WO | WO 2005/040962 | 5/2005 |
| WO | WO 2007/015531 | 2/2007 |
| WO | WO 2009/019753 | 2/2009 |

OTHER PUBLICATIONS

International Search Report for International Application No. PCT/JP2007/065352.

(Continued)

*Primary Examiner* — Lisa Hashem
(74) *Attorney, Agent, or Firm* — Ditthavong Mori & Steiner, P.C.

(57) ABSTRACT

An advertising-effectiveness determination method includes receiving a call made based on identification information provided to an information-providing medium in association with advertisement information. The call is connected to a call receiver indicated by the identification information. Input information input into a calling equipment of the call receiver and sent from the calling equipment is received. An effectiveness of the advertisement information is determined based on the received input information.

13 Claims, 7 Drawing Sheets

(56) References Cited

U.S. PATENT DOCUMENTS

| | | | |
|---|---|---|---|
| 2007/0274484 A1* | 11/2007 | Frank et al. | 379/114.13 |
| 2008/0130843 A1 | 6/2008 | Ueshima | |
| 2009/0067599 A1* | 3/2009 | Agarwal et al. | 379/114.21 |
| 2009/0089146 A1* | 4/2009 | Teterin | 705/10 |
| 2009/0136011 A1* | 5/2009 | Goel | 379/114.01 |
| 2009/0190730 A1* | 7/2009 | Liu et al. | 379/114.13 |
| 2010/0070351 A1* | 3/2010 | Kang | 705/14.1 |
| 2010/0088152 A1* | 4/2010 | Bennett | 705/10 |
| 2010/0250451 A1* | 9/2010 | McCullough et al. | 705/304 |
| 2010/0287047 A1* | 11/2010 | Zohar et al. | 705/14.41 |
| 2011/0166938 A1* | 7/2011 | Deridder et al. | 705/14.58 |
| 2011/0196750 A1* | 8/2011 | Hamill | 705/14.73 |
| 2011/0231247 A1* | 9/2011 | Srinivasan et al. | 705/14.43 |
| 2011/0282739 A1* | 11/2011 | Mashinsky et al. | 705/14.53 |
| 2011/0293081 A1* | 12/2011 | Han et al. | 379/114.1 |
| 2012/0002664 A1* | 1/2012 | Berk | 370/352 |
| 2012/0002795 A1* | 1/2012 | Berk | 379/114.01 |
| 2012/0002799 A1* | 1/2012 | Berk | 379/211.02 |
| 2012/0004978 A1* | 1/2012 | Kothari et al. | 705/14.42 |
| 2012/0170730 A1* | 7/2012 | Rothschild | 379/114.13 |
| 2013/0012158 A1* | 1/2013 | Altberg et al. | 455/406 |
| 2013/0094641 A1* | 4/2013 | Berk | 379/114.13 |
| 2013/0159093 A1* | 6/2013 | Chavan | 705/14.45 |

OTHER PUBLICATIONS

Written Opinion of the International Searching Authority for International Application No. PCT/JP2007/065352.
Extended European Search Report for corresponding EP Application No. 07805899.7—2414, Mar. 1, 2012.

* cited by examiner

FIG. 3

| Advertiser | Advertisement information | Identification information | Management ID | | | | |
|---|---|---|---|---|---|---|---|
| | | | MID | DID | SID | PID | UID |
| qq corporation | ~For pp, leave it to qq corporation~ | 0125423-0011002553 | 123 | 234 | 345 | 456 | 561 |
| yy shop | ~For xx, leave it to yy shop~ | 0125423-0011002554 | 123 | 234 | 345 | 456 | 562 |
| bb office | ~For aa, leave it to bb office~ | 0125423-0011002555 | 123 | 234 | 345 | 456 | 563 |
| ... | ... | ... | ... | ... | ... | ... | ... |

FIG. 5

Input-information cross-checking database E

| Cross-checking information | Content | Charging coefficient |
|---|---|---|
| #1 | Great advertising effectiveness | 1 |
| #2 | Some advertising effectiveness | 0.8 |
| #3 | Little advertising effectiveness | 0.5 |
| #4 | No advertising effectiveness at all | 0.2 |

ADVERTISING-EFFECTIVENESS DETERMINATION METHOD, ADVERTISING-EFFECTIVENESS DETERMINATION SYSTEM, AND ADVERTISING-EFFECTIVENESS DETERMINATION PROGRAM

CROSS-REFERENCE TO RELATED APPLICATIONS

The present application is a continuation application of International Application No. PCT/JP2007/065352, filed Aug. 6, 2007. The contents of this application are incorporated herein by reference in their entirety.

BACKGROUND OF THE INVENTION

1. Field of the Invention

The present invention relates to an advertising-effectiveness determination method, an advertising-effectiveness determination system, and an advertising-effectiveness determination program.

2. Discussion of the Background

Pay-per-click systems have been used as one method of advertising using web pages on the Internet. A pay-per-click system is a system in which an advertising agency charges an advertisement fee to an advertiser according to the number of times an item of advertisement information displayed on a web page is clicked.

For example, when advertisement information of the advertiser is posted on a web page of an advertisement-providing site and a user who has viewed the page selects (clicks) the advertisement information, the advertisement information is linked to a website managed by the advertiser and the user can view detailed information regarding the advertisement information. In addition, according to the number of clicks made on the advertisement information, the advertiser pays an advertisement fee to the administrator of the portal site.

This method is frequently used in portal (entrance) sites that have many users (viewers) and are capable of providing high advertising effectiveness. The administrator of the portal site establishes frames for advertisements as part of the site page, runs advertisements by lending the frames for advertisements to advertisers, and collects advertisement fees according to the number of clicks made on each item of advertisement information.

However, this pay-per-click system has a problem in that, when an advertiser does not have their own site, no site can be set to be linked to and no detailed information regarding the advertisement information can be provided. Moreover, because payment of an advertisement fee is generated simply through clicks made on advertisement information, "direct contact with users (clients)" cannot be obtained as the effect for the cost of advertising.

Moreover, because the advertisement fee is generated according to the number of clicks made even when a user unintentionally clicks the advertisement information or intentionally repeats clicking, the association between the advertising effectiveness and the advertisement fee may be decreased.

Therefore, another system has been suggested in which a phone number corresponding to each advertiser is posted on a web page of an advertisement-providing site along with the advertisement information, and when a user who has seen the information calls the advertiser, an advertisement fee is charged based on the establishment of the phone call. One of the systems using this advertising method is referred to as a Pay-Per-Call system, such as the one described in Japanese Patent Application Publication (KOKAI) No. 2005-115945, for example.

According to this Pay-Per-Call system, a phone call is made from a user, who has come into contact with the advertisement information, to the advertiser, and it is therefore easier for the advertiser to perceive the advertising effectiveness, which is preferable. Moreover, this system is preferable for users because a sense of security can be obtained by making a phone call directly to the advertiser, and detailed information regarding the advertisement information can be asked for directly from the advertiser. In addition, it is easier for the advertiser to obtain satisfaction with the charges of advertisement fees because the advertisement fees are charged based on the establishment of the phone call.

In the advertising method of this Pay-Per-Call system, another method has been performed in which the presence or absence of advertising effectiveness is determined depending on call duration and charging of the advertisement fee is adjusted based on the presence or absence of advertising effectiveness. In such a method, for example, if the call duration is less than 15 seconds, it is determined as "no advertising effectiveness" and the fee is not charged, and if the call duration is more than 15 seconds, it is determined as "presence of advertising effectiveness" and the advertiser is charged for the advertisement fee.

This method of determining the presence or absence of advertising effectiveness depending on the call duration is based on the premise that "if the call duration is long, in many cases, there is a detailed explanation regarding a product or transfer of information regarding payment between the user and the advertiser and it is likely that a commercial transaction has been effected" and the premise that "if the call duration is short, there is a low amount of transfer of information between the user and the advertiser and it is likely that a commercial transaction has not been effected."

However, the length of the call duration may not reflect the degree of the advertising effectiveness as it is. For example, if the user asks many questions about a product, etc. and consequently decides not to purchase that product, a commercial transaction has not been effected even though the call duration is long and the advertiser cannot obtain advertising effectiveness. If the advertisement fee is charged depending on the call duration even in such a case, payment of the advertisement fee is required even though no advertising effectiveness has been obtained, which is disadvantageous to the advertiser.

SUMMARY OF THE INVENTION

According to one aspect of the present invention, an advertising-effectiveness determination method includes receiving a call made based on identification information provided to an information-providing medium in association with advertisement information. The call is connected to a call receiver indicated by the identification information. Input information input into a calling equipment of the call receiver and sent from the calling equipment is received. An effectiveness of the advertisement information is determined based on the received input information.

According to another aspect of the present invention, an advertising-effectiveness determination system includes a call connection part, an input-information receiving part, and an effectiveness determination part. The call connection part is configured to receive a call made based on identification information provided to an information-providing medium in association with advertisement information and configured to connect the call to a call receiver indicated by the identification information. The input-information receiving part is configured to receive input information input into a calling equipment by the call receiver and sent from the calling equipment. The effectiveness determination part is configured to determine an effectiveness of the advertisement information based on the received input information.

According to still another aspect of the present invention, an advertising-effectiveness determination program causes a computer to perform receiving a call made based on identification information provided to an information-providing medium in association with advertisement information. The call is connected to a call receiver indicated by the identification information. Input information input into a calling equipment of the call receiver and sent from the calling equipment is received. An effectiveness of the advertisement information is determined based on the received input information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a data structure diagram of an information management database built in the advertisement server shown in FIG. 1;

FIG. 5 is a data structure diagram of an input-information cross-checking database built in the call receiving server shown in FIG. 4;

DESCRIPTION OF THE EMBODIMENTS

Figure 1:
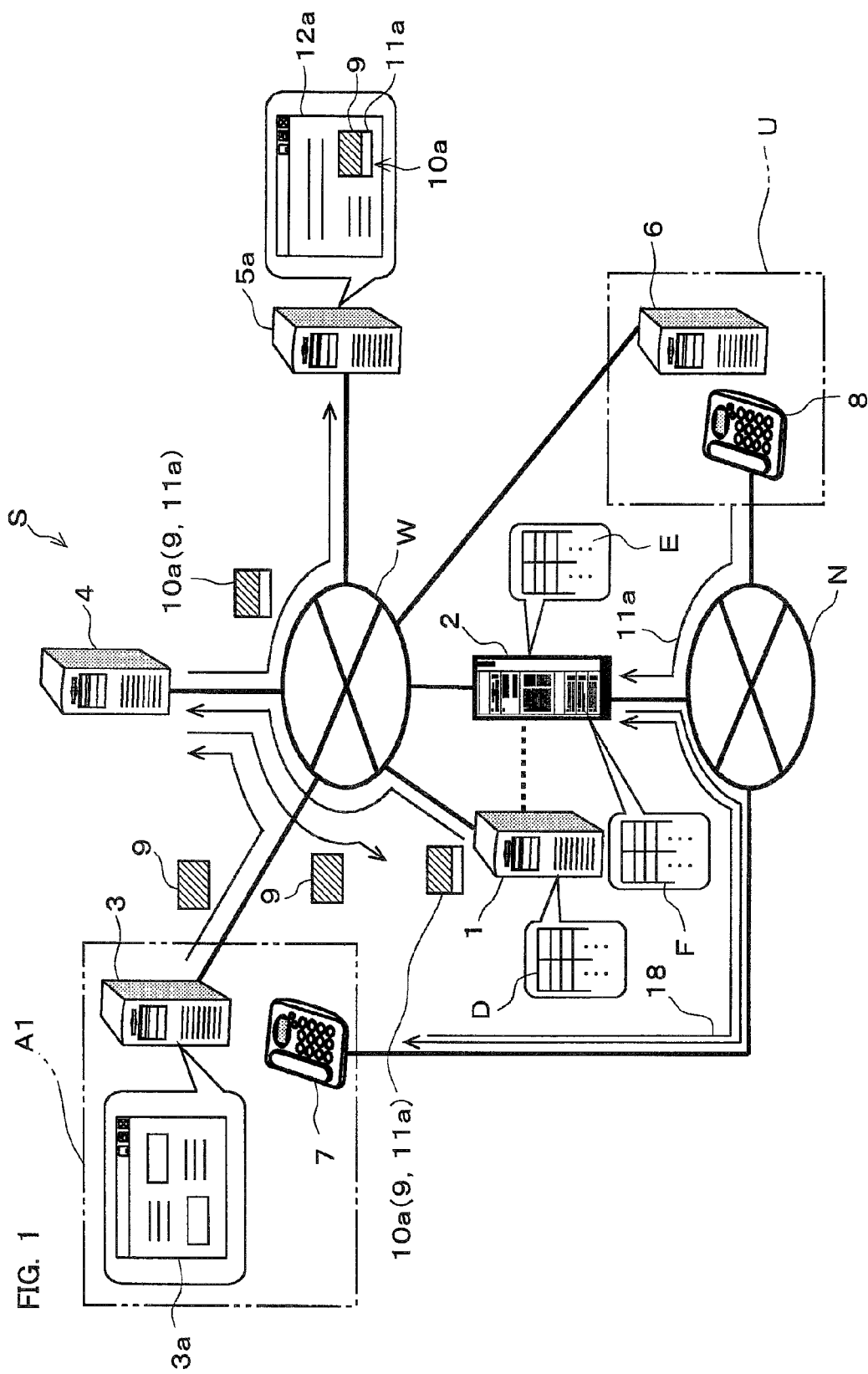
FIG. 1 is a schematic diagram showing the overall configuration of an advertising system S using an advertising-effectiveness determination method according to Embodiment 1 of the present invention.

The embodiments will now be described with reference to the accompanying drawings, wherein like reference numerals designate corresponding or identical elements throughout the various drawings.

Referring now to the accompanying drawings, a description will be now given of an advertising system S using an advertising-effectiveness determination method according to an embodiment of the present invention. In the present specification, a server means a server computer, and a site (a website and an Internet site are also generally synonymous) means a collective entity of web pages built virtually within the server. A web page can be specified by an URL and is a virtual-information-providing medium in which various types of information, such as character information and image information, are posted. Herein, "posting on a website" is used in a synonymous manner with "posting on a web page", and "viewing a website" is used in a synonymous manner with "viewing a web page".

In addition, in the present Embodiment 1, a case is described in which advertisement information 10a is posted on an advertisement-providing site (website) 12a as an information-providing medium. However, the present invention is also applicable in cases in which the advertisement information is posted on a publication as an information-providing medium and in cases in which the advertisement information is broadcast on a broadcasting medium as an information-providing medium, etc.

FIG. 1 is a schematic diagram showing the overall configuration of this advertising system S. This advertising system S is roughly configured with an advertisement server 1 and a call receiving server (advertising-effectiveness determination system) 2, and the advertisement server 1 is connected to an advertiser's server 3, an agent's server 4, an advertisement-providing server 5a, and a user's computer 6 via the Internet W in a manner that allows information to be received and sent. The advertiser and the user have an advertiser's phone (call receiver's calling equipment) 7 and a user's phone (caller's calling equipment) 8, respectively, which are connected to the call receiving server 2 via a telephone network N. Described separately below are a process leading to providing advertisement information at the advertisement-providing server 5, a process for receiving a call from a user U who has come into contact with the advertisement information and connected to an advertiser A1, and a process to determine the effectiveness of the advertisement information.

In addition, in this advertising system S using the advertising-effectiveness determination method, a Pay-Per-Call system is employed. If the advertiser A1 wishes to provide their own advertisement information 10a, they prepare a contract with an advertising agent regarding the provision of an advertisement and request the advertising agent to provide the advertisement information 10a. Then, the advertising agent posts the requested advertisement information 10a on a website managed by the agent or an advertisement-providing site 12a managed by an associated advertisement provider. If there is a call from a user based on the posted advertisement information 10a, the advertising agent charges the advertiser A1 for an advertisement fee based on the understanding that the provision of the advertisement information 10a had advertising effectiveness.

<Process of Providing the Advertisement Information>

The advertiser's server 3 is a server computer managed by the advertiser A1, wherein an advertiser's website (advertiser's site) 3a is built internally. When the advertiser A1 sends a banner image 9 for the advertisement information from this advertiser's server 3 to the agent's server 4, the banner image 9 is forwarded from the agent's server 4 to the advertisement server 1 described below. Then, in the advertisement server 1, the banner image 9 and identification information 11a are combined, further associated with a management ID 14a, and returned to the agent's server 4 as advertisement information 10a. The advertisement information 10a is sent from the agent's server 4 to the advertisement-providing server 5a.

Figure 2:
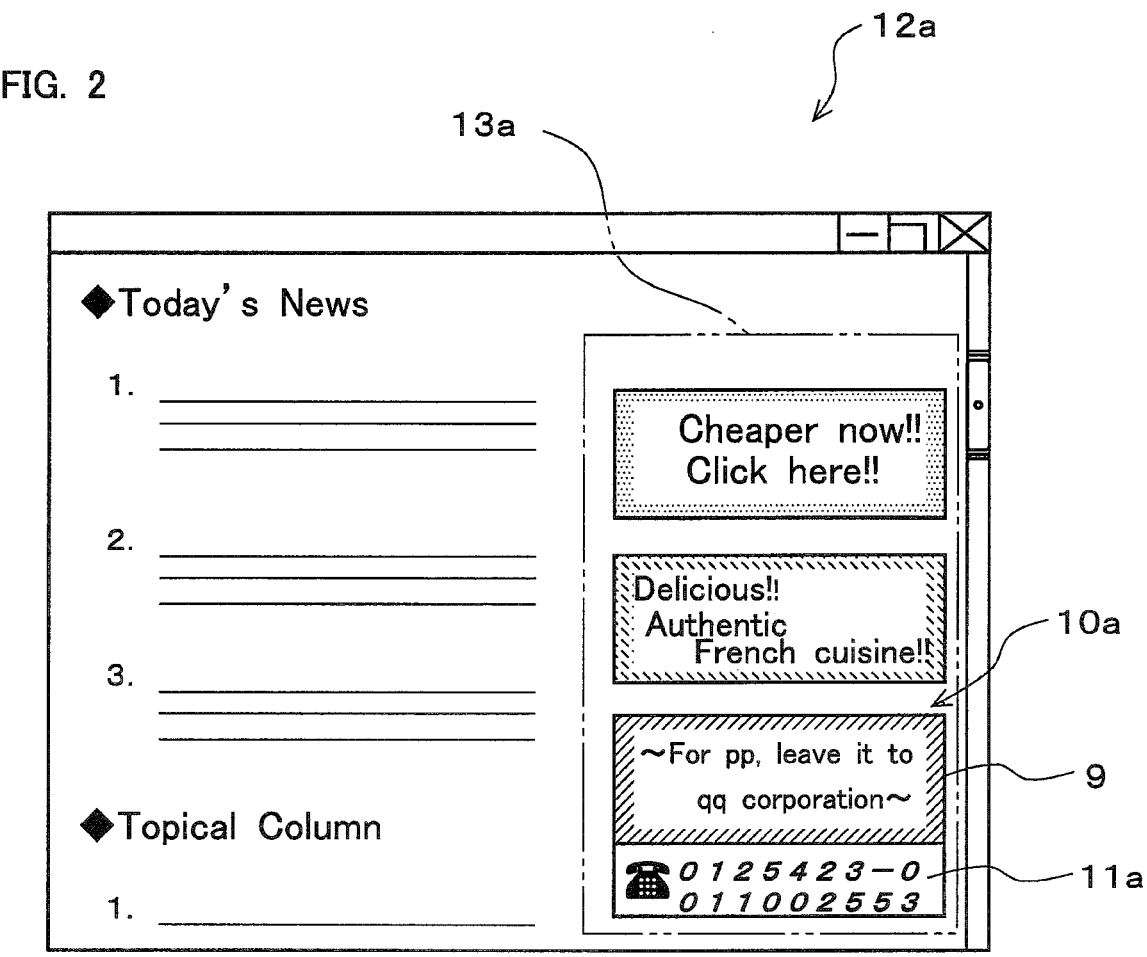
FIG. 2 is an example of a display screen for a web page of an advertisement-providing site built in the advertisement-providing server shown in FIG. 1.

In the advertisement-providing server 5a, as shown in FIG. 2, the received advertisement information 10a is posted within an advertisement frame 13a configured on a web page of the advertisement-providing site 12a. In this case, the identification information 11a is also posted on the advertisement-providing site 12a. Then, when the user U who has come into contact with this advertisement information 10a by accessing the advertisement-providing server 5a using the user's computer 6 makes a call with the user's phone 8 based on the identification information 11a, the call will be received by the call receiving server 2.

As shown in FIG. 3, an information management database D is stored in the advertisement server 1. This information management database D is built by mutually associating the advertiser A, the advertisement information 10, the identification information 11, and the management ID 14.

The identification information 11 is information for identifying the advertiser A1 as a call receiver and is typically a 17-digit phone number allocated to the advertiser A1 (e.g., "0125423-0011002553" etc.). This phone number is configured with a server identification number in the first 7 digits and an advertisement identification number in the latter 10 digits, for example. Specifically, when the user U calls the phone number indicated by the identification information 11, the call is connected to the advertiser A1, thereby allowing the phone call to the advertiser A1 to be made.

Of course, the identification information 11 is not limited to 17-digit phone number information and may be 2- to 4-digit information that is a part of a phone number or may be an input number of a few digits for the user U to input into the destination server after making the call. Moreover, if the destination server has a voice-recognition function, the identification information 11 may also be a keyword for the user U to say during the call.

The management ID 14 is information allocated to each item of the advertisement information 10 for managing accounts. For calls based on the identification information 11, information such as history information and the call durations thereof is managed for each management ID 14 and used in calculating the advertisement fees to be charged. This management ID is composed of an MID (advertiser ID) 14p, a DID (advertising agent ID) 14q, a PID (merchandise ID) 14r, and an SID (advertisement-providing site ID) 14s, for example. Specifically, the management ID 14 allows for identifying advertisement information for merchandise posted on an advertisement-providing site managed by an advertising agent. Furthermore, if the management ID 14 includes a UID (personal page ID) 14t, the management ID allows for identifying advertisement information based on a contract with an advertisement-providing site administrator (advertisement provider) and posted on a personal page (or a personal blog, etc).

If one advertiser posts one advertisement information (including one identification information) on one advertisement-providing site, one identification information and one management ID are associated with the advertisement information. Therefore, in such a case, accounts can be managed with the identification information, making the management ID unnecessary. However, for example, if one item of advertisement information (including one item of identification information) is posted on a plurality of advertisement-providing sites, if one advertiser post a plurality of items of advertisement information on one advertisement-providing site, or if different items of identification information are dynamically allocated to one advertisement information from day to day, etc., it is difficult to manage accounts with only the identification information and it is desirable to manage accounts using the ID. In addition, in the present Embodiment 1, for ease of description, a case is described in which one item of identification information 11 corresponds to one item of advertisement information 10 in a fixed manner.

<Call Receiving Process>

When the user U makes a call from the user's phone 8 based on the identification information 11a, the call is received by the call receiving server 2. The call receiving server 2 is a server computer for receiving a call from the user's phone 8 of the user U and is connected to the Internet W and the telephone network N. The user's phone 8 and the advertiser's phone 7 of the advertiser A1 are also connected to this telephone network N, allowing the user U to make a call to the advertiser A1 via the call receiving server 2. The call receiving server 2 may be connected not to the Internet W but directly to the advertisement server 1 as shown in FIG. 1.

Figure 4:
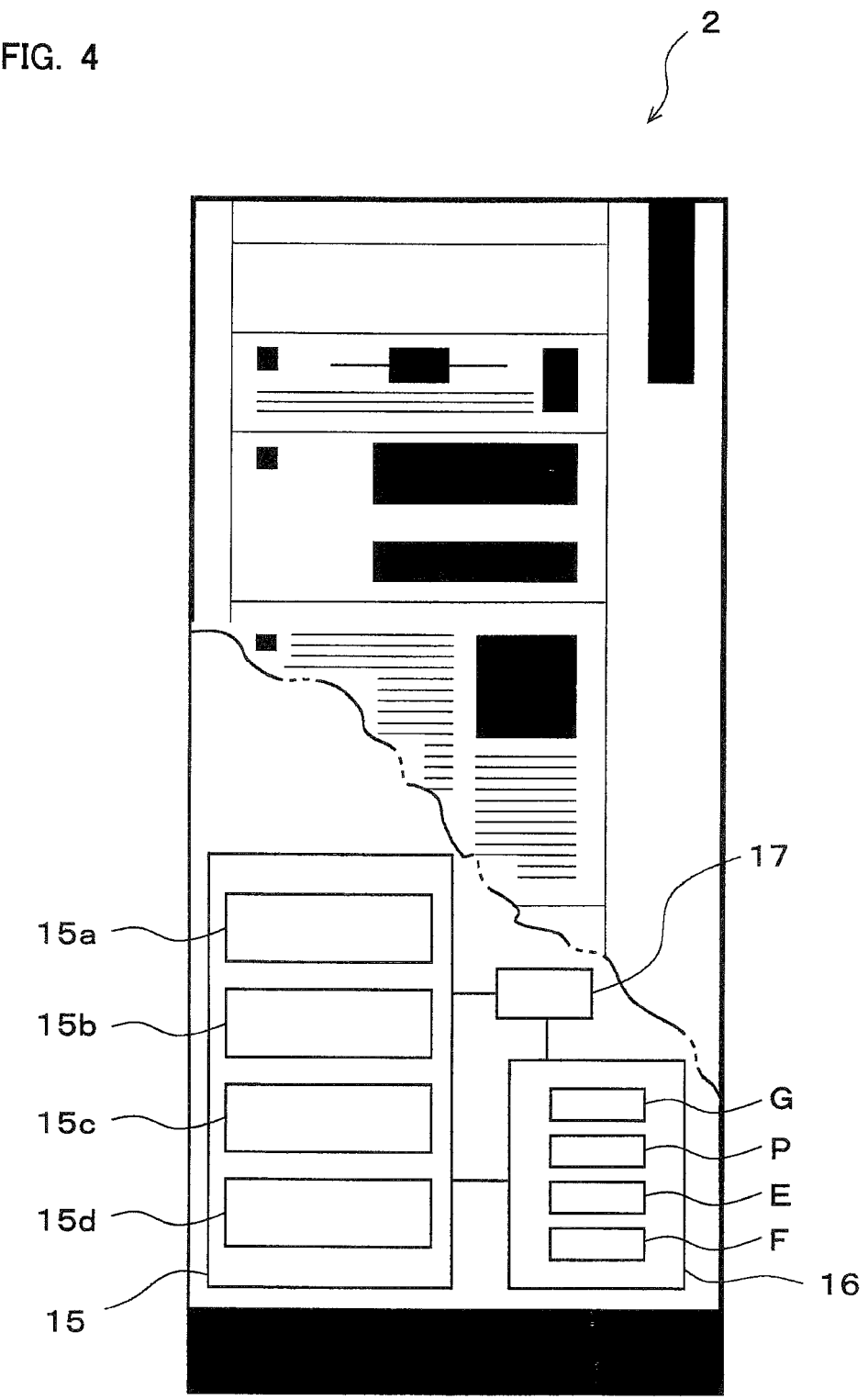
FIG. 4 is a block diagram showing the internal configuration of the call receiving server shown in FIG. 1.

The call receiving server 2 has an internal central processing unit (CPU; the principal part of a computer) 15, a storage device 16, and a memory 17 as shown in FIG. 4. The storage device 16 includes an advertising-effectiveness determination program P, an input-information cross-checking database E, a charging database F, and a call-content storage area G. Then, the advertising-effectiveness determination program P causes the CPU 15 to function as a call connection part 15a, an input-information receiving part 15b, an input-information cross-checking part 15c, and an effectiveness determination part 15d.

The call connection part 15a has a function to receive a call made based on the identification information 11 provided on an information-providing medium to provide a connection to the call receiver indicated by the identification information 11. Specifically, when the user U inputs "0125423-0011002553" into the user's phone 8 based on the identification information 11a posted on the advertisement-providing site 12a, the call is made to the call receiving server 2 based on the first 7-digit server identification number. The call connection part 15a recognizes the call without receiving it and acquires information of the input 17-digit identification information 11a ("0125423-0011002553"). As the call connection part 15a does not receive the call, the user U may make the phone call smoothly as if they had directly called the call receiver without becoming aware of the relay of the call receiving server 2.

The call connection part 15a specifies the advertiser A1 as the call receiver based on the acquired identification information 11a and the information management database D. Then, it connects a call from the user's phone 8 to the advertiser's phone 7 as the call receiver's calling equipment. By making a phone call to the advertiser A1, the user U may ask about a product, etc. related to the advertisement information 10a, receive explanations thereof, and determine whether they will purchase the product, etc. In addition, the content of this call between the advertiser A1 and the user U is recorded into the memory 17. Moreover, at the same time as the start of the phone call between the advertiser A1 and user U, the call receiving server 2 starts to time the call, associates the history information 22 of the call, such as starting time and call duration (see FIG. 6), with the identification information 11a, and stores it within the charging database F described below.

<Process of Determining Advertising Effectiveness>

A process is described as follows in which input information 18 is input after a call from the user U is received and the effectiveness of the advertisement information 10a is based on the input information 18.

The input-information receiving part 15b has a function to receive the input information 18 input into the advertiser's phone 7 of the advertiser A1 as the call receiver and sent from the advertiser's phone 7. If the advertiser A1 inputs pre-defined input information 18 with the advertiser's phone 7 at the end of the phone call with the user U, the input information 18 will be sent to the call receiving server 2 and received by the input-information receiving part 15b.

This input information is any of four types of information ("#1", "#2", "#3", "#4") input with push buttons, for example.

When any of these is input, the push-tone signal allows the input-information receiving part 15b to recognize the content of the input information.

Herein, these four types of input information 18 each correspond to the degree of advertising effectiveness based on a determination made by the advertiser A1. For example, the advertiser A1 inputs "#1" corresponding to "great advertising effectiveness" if the user U purchased a product, etc. If the user U did not purchase the product, etc. but asked for informational materials, etc., and therefore became a customer with high potential for purchases in the future, "#2" corresponding to "some advertising effectiveness" is input. If some customer information of the user U was obtained, "#3" corresponding to "little advertising effectiveness" is input. If little customer information of the user U was obtained, "#4" corresponding to "no advertising effectiveness at all" is input.

The call receiving server 2 prompts the advertiser's phone 7 to input the input information 18 if there is no input of the input information 18 within a first predefined duration. Specifically, when it is judged that the phone call between the advertiser A1 and the user U has finished based on a continued silent state lasting a certain duration or an input of a push-tone signal indicating the end of the phone call, etc., the call receiving server 2 starts a timer at that point and waits for an input of the input information 18 by the advertiser A1 for the first predefined duration (e.g., 10 seconds). Then, if an input of the input information 18 cannot be confirmed during that duration, an announcement message stating "Please input the input information" is played on the advertiser's phone 7.

Then, the call receiving server 2 again waits for an input of the input information 18 by the advertiser A1 for the first predefined duration (e.g., 10 seconds), and if an input of the input information 18 cannot be confirmed during that period, it is automatically deemed that there was an input of "#1" corresponding to "great advertising effectiveness". This can allow for accelerated prompting of an input of the input information 18 and processing of determining effectiveness.

If it is confirmed that the call was finished (i.e., the phone was disconnected) without an input of the input information 18, this call receiving server 2 automatically makes a call to the advertiser's phone 7, makes an announcement stating "Please input the input information regarding the last phone call", and again waits for an input of the input information 18. In addition, the received input information 18 is sent to the input-information cross-checking part 15c.

The input-information cross-checking part 15c has a function to cross-check the input information 18 received from the input-information receiving part 15b against a plurality of items of cross-checking information 19 previously stored in the input-information cross-checking database E. As shown in FIG. 5, the input-information cross-checking database E is built by mutually associating a plurality of items of cross-checking information 19 and charging-coefficient information 20 thereof, for example.

This charging-coefficient information 20 is a coefficient of the advertisement fee charged to the advertiser A1 for a call from the user U to the advertiser A1 depending on the advertising effectiveness, which is accumulated against the basic advertisement fee previously arranged between the advertiser A1 and the advertising agent. Therefore, the amount charged for the advertisement fee corresponding to "#1" is the highest and the amount charged for the advertisement fee corresponding to "#4" is the lowest.

The input-information cross-checking part 15c cross-checks whether the input information 18 corresponds with this cross-checking information 19 in the input-information cross-checking database E and sends the input information 18 and corresponding charging-coefficient information 20 to the effectiveness determination part 15d if the items of information correspond with each other.

The input-information cross-checking part 15c has a function to prompt the advertiser's phone 7 to reinput the input information 18 if the input information 18 and the cross-checking information 19 do not correspond with each other. Specifically, if both the information 18 and 19 do not correspond with each other, under the determination that an input error has been made by the advertiser A1, an announcement message stating "Please input the correct input information once again" is played on the advertiser's phone 7.

If the input information 18 is cross-checked against the cross-checking information 19 by this input-information cross-checking part 15c and the input information 18 is other than "#4", the call content recorded in the memory 17 is deleted. If the input information 18 is "#4", the call content in the memory 17 is stored into the call-content storage area G within the storage device 16. This allows for deleting unwanted call content to save storage area in the storage device 16 while storing call content related to the input information 18 of "#4" to confirm the content at a later date.

The effectiveness determination part 15d has a function to determine the effectiveness of the advertisement information 10a based on the received input information 18. "To determine the advertisement information 10a based on the input information 18" in this case includes "to store the input information 18 in the charging database F and associate information of the call based on the advertisement information 10a with the input information 18", and "to adjust the advertisement fee for the call based on the advertisement information 10a based on the input information 18".

Figure 6:
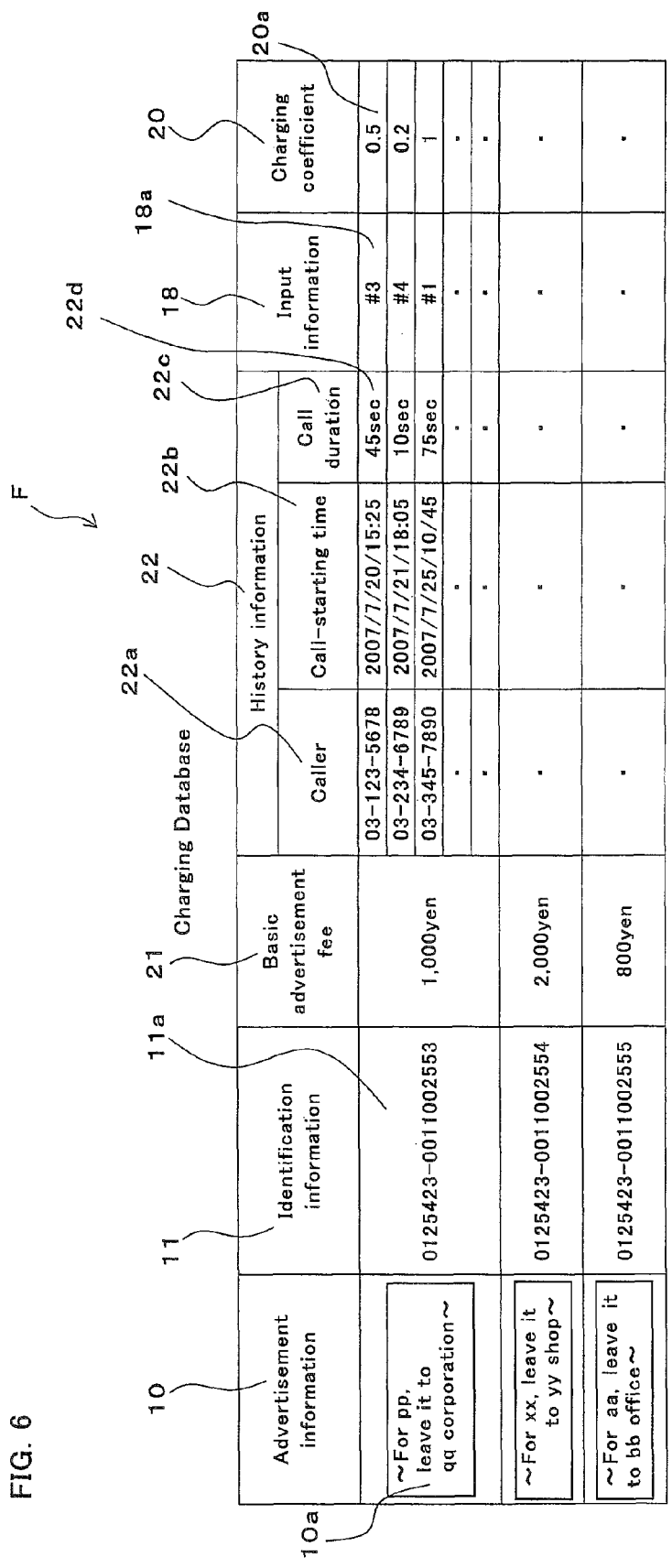
FIG. 6 is a data structure diagram of a charging database built in the call receiving server shown in FIG. 4.

The charging database F is built with the advertisement information 10, the identification information 11, basic-advertisement-fee information 21, the history information 22, the input information 18, and the charging-coefficient information 20, as shown in FIG. 6. This basic-advertisement-fee information 21 is an amount previously arranged between the advertiser A1 and the advertising agent for the advertisement information 10a (e.g., 1,000 yen).

Based on information from the call connection part 15a, the history information 22 is associated with the advertisement information 10a and the identification information 11a and stored. This history information 22 is history information of calls made based on the identification information 11a and includes caller information 22a, call-starting-time information 22b, call-duration information 22c, etc. If there is a plurality of calls from a plurality of users based on the identification information 11a, a plurality of items of history information 22 are stored corresponding to the identification information 11a. The caller information 22a is information on the originating phone number of the user's phone 8 specified by using an originator-number notification function provided by a telephone company, for example.

Based on information from the input-information cross-checking part 15c, the input information 18 and the charging-coefficient information 20 are stored for each item in the call history by the effectiveness determination part 15d. As shown in FIG. 6, if the input information 18 of "#4" is associated with the call history, the charging-coefficient information 20 will be "1". In this case, the amount of the advertisement fee for the call charged to the advertiser A1 will be 1,000 yen. However, if the input information 18 of "#1" is associated with the call history, the charging-coefficient information 20 will be "0.2". In this case, the amount of the advertisement fee for the call charged to the advertiser A1 will be 200 yen.

This call receiving server 2 automatically changes the input information if the call-duration information 22c in the charging database F exceeds a second predefined duration. For example, if the call duration is over 15 seconds (second predefined duration), even if the input information 18 for the call based on the identification information 11a is "#3" or "#4", the input information 18 is automatically changed to "#1". If the call duration is over 15 seconds, sufficient advertising effectiveness has been obtained and it is therefore determined to be an input error or cheating by the advertiser A1 if the input information 18 is "#3" or "#4". This allows the input information 18 to reflect the will of the advertiser A1 while deeming that a long call duration has exerted a high advertising effectiveness.

For example, the input information 18a in FIG. 6 is "#3" and the charging-coefficient information 20a is "0.5". However, the call duration 22d of the history information 22 corresponding to this information is 45 seconds and the input information 18a is therefore automatically changed to "#1", and accordingly, the charging-coefficient information 20a is also automatically changed to "1".

Of course, the determined result of the effectiveness of the advertisement information 10a may be changed without changing the input information 18 itself. Specifically, in the present Embodiment 1, without changing the input information 18a in the charging database F, only the charging-coefficient information 20a corresponding to the determination result of the effectiveness of the advertisement information 10a may be changed depending on the call duration.

In accordance with the process described above, based on the input information 18 input in each call based on the identification information 11, the effectiveness exerted by the advertisement information 10 in each call is determined and consequently, the charged amount of advertisement fees for each call is calculated. The call receiving server 2 sends information of the charged amount of advertisement fees calculated for each call to the agent's server 4 via the advertisement server 1 or directly.

Figure 7:
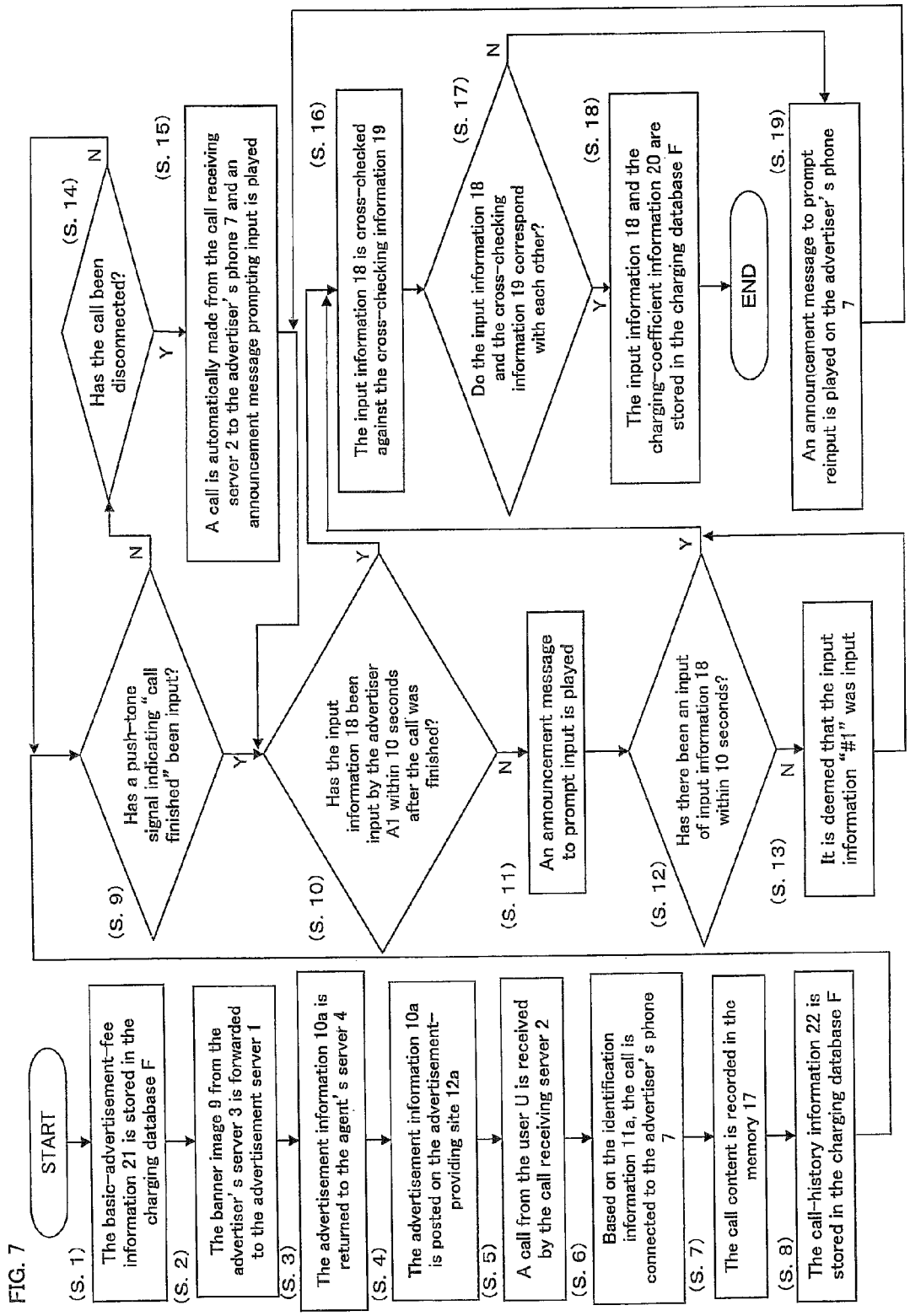
FIG. 7 is a flow chart describing operations of the advertising system using the advertising-effectiveness determination method according to Embodiment 1 of the present invention.

Next, the operations of the advertisement information management system S using the advertisement information management method according to this Embodiment 1 will be described using the flow chart shown in FIG. 7.

Upon receiving a request from the advertiser A1 for advertising the advertisement information 10a, the advertiser A1 and the advertising agent make an arrangement regarding the basic-advertisement-fee information 21. Then, the basic-advertisement-fee information 21 is stored in the charging database F (S. 1). When the banner image 9 is sent from the advertiser's server 3 to the agent's server 4, the banner image 9 is forwarded to the advertisement server 1 (S. 2). The banner image 9 and the identification information 11a are combined and returned to the agent's server 4 as the advertisement information 10a (S. 3). In doing so, in the advertisement server 1, the advertiser A1, the advertisement information 10a, the identification information 11a, and the management ID 14a are mutually associated and the information management database D is created. The advertisement information 10a is sent to the advertisement-providing server 5a and posted on the advertisement-providing site 12a (S. 4).

When the user U who has accessed the advertisement-providing site 12a with the user's computer 6 and has come into contact with the advertisement information 10a makes a call based on the identification information 11a, the call is received by the call receiving server 2 (S. 5). Based on the identification information 11a, the advertiser A1 is specified as the call receiver and the call is connected to the advertiser's phone 7 (S. 6). The call content is recorded in the memory 17 (S. 7) and the call-history information 22 (call-starting time, call duration, etc.) is stored in the charging database F (S. 8).

If a predefined push-tone signal indicating "call finished" is input by the advertiser A1 or the user (S.9), and if there is no input of the input information 18 from the advertiser A1 within 10 seconds after the call is finished (S. 10), an announcement message stating "Please input the input information" is played on the advertiser's phone 7 (S. 11). Subsequently, if there is no input of the input information 18 within another 10 seconds (S. 12), it is deemed that "#1" was input (S. 13).

If the call is disconnected (S.14) without an input of the predefined push-tone signal indicating "call finished" (S.9), a call is automatically made from the call receiving server 2 to the advertiser's phone 7 and an announcement message stating "Please input the input information regarding the last phone call" is played (S. 15).

If there is an input of the input information 18 within 10 seconds after the call is finished (S. 10), the input information 18 is cross-checked against the cross-checking information 19 (S. 16). If the input information 18 and the cross-checking information 19 correspond with each other (S. 17), the input information 18 and the corresponding charging-coefficient information 20 are stored in the charging database F (S. 18).

If the input information 18 and the cross-checking information 19 do not correspond with each other (S. 17), an announcement message stating "Please input the correct input information once again" is played on the advertiser's phone 7 (S. 19).

In Embodiment 2 of the present invention, a case is described in which the CPU 15 of the call receiving server 2 also functions as a payment-information receiving part. This payment-information receiving part has a function to play an announcement message that prompts the input of payment information to the user's phone 8 at a stage before a call from the user U is received at the call receiving server 2 by the call connection part 15a and the call is connected to the advertiser's phone 7.

Herein, the payment information refers to information available for debiting the expense of a product, etc., such as a credit card number and bank account information used by the user U to purchase the product, etc. When the user U inputs the payment information using push-tone signals, etc. from the user's phone (caller's calling equipment) 8, the payment information is received by the payment-information receiving part and stored in the memory 17 of the call receiving server 2. However, at this point, only the input of the payment information is performed and the payment is not yet executed.

When the user U decides to purchase the product, etc. after the phone call between the advertiser A1 and the user U is finished, the advertiser A1 inputs the input information 18 "#1" into the advertiser's phone 7. Input of this "#1" input information 18 is handled as an execution of payment, and payment for the purchase price of the product, etc. is executed at this point.

This allows the task of inputting payment information, which is complex and time-consuming, to be performed before connecting a call between the user U and the advertiser A1, thereby contributing to reduced call traffic without unnecessarily prolonging the call duration with the complicated task. Moreover, because payment is not executed until the advertiser A1 inputs the input information 18 "#1", even if the product, etc. is not purchased as a result of the explanation from the advertiser A1, it is not necessary to perform troublesome procedures such as canceling the payment process.

In Embodiment 3 of the present invention, a case is described in which the CPU 15 of the call receiving server 2 also functions as a correction-information receiving part that receives correction information input into the advertiser's server 3, which acts as input equipment other than the advertiser's phone 7. For example, after the input information 18 is input with the advertiser's phone 7 and the call is finished, the advertiser A1 may wish to correct the input information 18. In this case, Embodiment 3 of the present invention enables correction of the input information 18 from a computer (server) acting as input equipment other than the phone.

This correction-information receiving part has a function to provide the content of the charging database F in an editable manner to the computer through access via the Internet W using a web browser. Specifically, when the web browser is activated at the advertiser's server 3 and a URL indicating the call receiving server 2 is input, the content of the charging database F is displayed on a display screen of the advertiser's server 3 as shown in FIG. 6.

When the advertiser A1 inputs new correction information over the input information 18 to be edited on the web browser, the input-information cross-checking database E will be referenced based on the new correction information and the charging-coefficient information 20 will be updated. In this way, when the input information is corrected later by the advertiser's server 3, the effectiveness of the advertisement information will be properly determined based on the correction information.

Further, the present invention is not limited to these preferred embodiments, and various variations and modifications may be made without departing from the spirit and scope of the present invention.

For example, in Embodiments 1 to 3 above, the server 1 and the call receiving server 2 have been contemplated as separated entities and described, but of course, they may be integrated, with one server functioning as both servers. Moreover, each of the functions of the CPU 15 is separately contemplated and described conveniently for ease of description and understanding, and in short, the CPU 15 acts as the principal part of the computer and fulfills each function described above, thereby allowing the advertising-effectiveness determination method according to the embodiments of the present invention to be implemented.

Of course, for storage locations of the information management database D and the charging database F and configurations thereof, it is possible to make some modifications and changes as long as internal associations of information are maintained.

An advertising-effectiveness determination method according to the embodiment of the present invention includes the steps of receiving a call made based on identification information provided on an information-providing medium in association with advertisement information and connection the call to a call receiver indicated by the identification information, receiving input information input into a calling equipment of the call receiver and sent from the calling equipment, and determining the effectiveness of the advertisement information based on the received input information.

Because the effectiveness of the advertisement information is determined based on the input information input into and sent from the call receiver's calling equipment, the will of the advertiser can be reflected in determining the advertising effectiveness. Because the effectiveness of the advertisement information can be determined while reflecting the will of the advertiser, instead of making uniform determinations based on the length of the call duration, a proper determination of the advertising effectiveness may be implemented. Because an advertisement fee properly corresponding to the degree of advertising effectiveness can be charged, it is easier for the advertiser to obtain satisfaction upon paying the advertisement fee.

In addition, herein, information-providing media include Internet websites (web pages), publications such as magazines or newspapers, or broadcasting media such as radio or television, for example. Moreover, identification numbers typically include phone numbers such as "0125423-0011002553" consisting of multiple-digit numbers, for example. Moreover, calling equipment typically includes phones and cell phones but also includes IP phones using a personal computer and an Internet network.

The level of effectiveness of the advertisement information may be determined based on at least three levels or more. Rather than having only two levels respectively indicating the presence or absence of advertising effectiveness, if four levels respectively indicating "great advertising effectiveness", "some advertising effectiveness", "little advertising effectiveness", and "no advertising effectiveness at all", for example, respectively correspond to "#1", "#2", "#3", and "#4" as input information, the degree of advertising effectiveness can be determined properly and in further detail.

The method may further include the steps of cross-checking the input information against a plurality of items of cross-checking information previously stored in an input-information cross-checking database, and prompting the call receiver to reinput the input information if the input information does not correspond with any of the cross-checking information.

Because a reinput of the input information can be prompted if the advertiser inputs information other than the predetermined input information by mistake, correct input information can be reinput anew. Consequently, inputting errors of the input information can be prevented, thereby the situations involving a failure to determine the effectiveness of the advertisement information can be prevented.

The method may further include the step of prompting the call receiver to input the input information if there is no input of the input information within a first predefined duration.

Because a reinput of the input information can be prompted if the advertiser does not input the input information within the first predefined duration, the advertiser can be prevented from forgetting to input the input information, thereby the situations involving a failure to determine the effectiveness of the advertisement information due to non-input of the input information can be prevented. Because input of the input information is prompted, the effectiveness of the advertisement information can be quickly determined.

The method may further include the step of deeming that there was an input of predefined input information if there is no input of the input information within the first predefined duration.

Because it is deemed that there was an input of predefined input information if the advertiser does not input the input information within the first predefined duration, the situations involving a failure to determine the effectiveness of the advertisement information due to non-input of the input information can be prevented. Moreover, because it is deemed that there was an input of predefined input information (e.g., "#1" input information indicating "great advertising effectiveness") if the advertiser forgets to input the input information, a psychological effect for preventing the advertiser from forgetting to make an input can be exerted on an advertiser who dislikes automatic input of that deemed information. This also allows for an accelerated determination of the effectiveness of the advertisement information.

The method may further include the steps of measuring the call duration of the call, and changing the received input information if the call duration exceeds a second predefined duration.

In cases in which the call duration exceeds the second predefined duration, even if the input information is, for example, "#4" indicating "no advertising effectiveness at all", by changing that input information into "#1" indicating "great advertising effectiveness", the long call duration can be determined to have a high advertising effectiveness while reflecting the will of the advertiser in determining the effectiveness of the advertisement information. Therefore, this can prevent the advertiser from cheating and inputting input information indicating low advertising effectiveness when the effectiveness is actually high.

The method may further include the steps of measuring the call duration of the call, and changing the determined result of effectiveness of the advertisement information based on the input information if the call duration exceeds the second predefined duration.

In cases in which the call duration exceeds the second predefined duration, even if the input information is, for example, "#4" indicating "no advertising effectiveness at all", by changing the determination of effectiveness based on that input information into "#1" indicating "great advertising effectiveness", the long call duration can be determined to have a high advertising effectiveness while reflecting the will of the advertiser in determining the effectiveness of the advertisement information. Therefore, this can prevent the advertiser from cheating and inputting input information indicating low advertising effectiveness when the effectiveness is actually high.

The method may further include the steps of receiving correction information input into input equipment other than the calling equipment after the call is finished, and determining the effectiveness of the advertisement information based on the correction information input into the input equipment.

Even if the advertiser inputs mistaken input information, the determination of the advertising effectiveness can be corrected and changed by inputting correction information into the input equipment later. In addition, herein, input equipment includes calling equipment other than the calling equipment related to the input of input information (e.g., another phone or cell-phone unit) or personal computers, for example.

The method may further include the step of automatically making a call for prompting the call receiver to input the input information if the call is finished without an input of the input information.

Because an automatic call is made to the advertiser's calling equipment and an input of the input information is prompted if the advertiser forgets to input the input information and finishes the call, input of the input information forgotten by the advertiser can be recovered and situations involving a failure to determine the effectiveness of the advertisement information due to non-input of the input information can be prevented.

The method may further include the steps of recording the content of the call, and determining whether or not to store a recording of the call content depending on the input information.

Because recordings of the call content can be selectively discarded depending on the input information without storing all recordings, it is possible to store only important call records, thereby contributing to saving storage area. For example, by storing the call records only in cases in which the input information is "#4" indicating "no advertising effectiveness at all", it can be confirmed at a later date whether there was really no advertising effectiveness at all based on the recording of the call content.

The method may further include the steps of charging the call receiver for an advertisement fee resulting from the call, and adjusting the advertisement fee based on the effectiveness of the advertisement information.

Because the effectiveness of the advertisement information is determined based on the input information of the advertiser and the advertisement fee to be charged is adjusted based on the effectiveness of the advertisement information, satisfactory charging of the advertisement fee can be implemented.

The method may further include the steps of receiving payment information input into a calling equipment of a caller and sent from the calling equipment of the caller before connecting the received call to the call receiver, and determining whether or not to execute payment based on the payment information depending on the input information.

Because inputting and receiving the payment information is completed before connecting the call to the call receiver, payment processing can be performed quickly and smoothly, consequently contributing to reduced call traffic. Then, because payment is executed depending on the input information, execution/inexecution of payment can be ensured without mistakes. For example, by executing payment only if input information "#1" is input, payment can be executed only if the user purchases a product (i.e., high advertising effectiveness is exerted).

An advertising-effectiveness determination system related to another exemplary aspect of the present invention includes a call connection part that receives a call made based on identification information provided on an information-providing medium in association with advertisement information and connecting the call to a call receiver indicated by the identification information, an input-information receiving part that receives input information input into a calling equipment by the call receiver and sent from the calling equipment, and an effectiveness determination part that determines the effectiveness of the advertisement information based on the received input information.

Because the effectiveness of the advertisement information is determined based on the input information input into and sent from the call receiver's calling equipment, the will of the advertiser can be reflected in determining the advertising effectiveness. Because the effectiveness of the advertisement information can be determined while reflecting the will of the advertiser, instead of making uniform determinations based on the length of the call duration, proper determinations of the advertising effectiveness can be made. Because advertisement fees properly corresponding to the degree of advertising effectiveness can be charged, it is easier for the advertiser to obtain satisfaction upon paying the advertisement fee.

An advertising-effectiveness determination program related to still another exemplary aspect of the present invention causes a computer to function as a call connection part that receives a call made based on identification information provided on an information-providing medium in association with advertisement information and connecting the call to a call receiver indicated by the identification information; an input-information receiving part that receives input information input into a calling equipment by the call receiver and sent from the calling equipment; and an effectiveness determination part that determines the effectiveness of the advertisement information based on the received input information.

Because the effectiveness of the advertisement information is determined based on the input information input into and sent from the call receiver's calling equipment, the will of the advertiser can be reflected in determining the advertising effectiveness. Because the effectiveness of the advertisement information can be determined while reflecting the will of the advertiser, instead of making uniform determinations based on the length of the call duration, proper determinations of the advertising effectiveness can be made. Because advertisement fees properly corresponding to the degree of the advertising effectiveness can be charged, it is easier for the advertiser to obtain satisfaction upon paying the advertisement fee.

Further objectives and other features of the present invention will become readily apparent from the following description of the preferred embodiments with reference to the accompanying drawings.

According to the embodiment of the present invention, instead of making uniform determinations based on the length of the call duration, the effectiveness of advertisement information can be determined while reflecting the will of the advertiser, and advertisement fees corresponding to the degree of advertising effectiveness can be charged.

Obviously, numerous modifications and variations of the present invention are possible in light of the above teachings. It is therefore to be understood that within the scope of the appended claims, the invention may be practiced otherwise than as specifically described herein.

What is claimed is:

1. An advertising-effectiveness determination method comprising:
    receiving a call made based on identification information provided to an information-providing medium in association with advertisement information;
    connecting said call to a call receiver indicated by the identification information;
    determining whether input information is received from a calling equipment of the call receiver; and
    determining an effectiveness of said advertisement information based on:
        received input information when said input information is received from the calling equipment when said input information is received within a first predefined duration, and
        a predefined input information when said input information is not received within the first predefined duration, wherein the predefined input information indicates a high level of advertising effectiveness.

2. The advertising-effectiveness determination method according to claim 1, wherein a level of the effectiveness of said advertisement information is determined based on at least three levels or more.

3. The advertising-effectiveness determination method according to claim 1, further comprising:
    cross-checking said received input information against a plurality of items of cross-checking information previously stored in an input-information cross-checking database; and
    prompting said call receiver to enter a correct input information if said received input information does not correspond to any of said cross-checking information.

4. The advertising-effectiveness determination method according to claim 1, further comprising:
    prompting said call receiver to input said input information if there is no input of said input information within another predefined duration that expires prior to an expiration of the first predefined duration.

5. The advertising-effectiveness determination method according to claim 1, further comprising:
    measuring a call duration of said call; and
    changing said received input information if the call duration exceeds a second predefined duration.

6. The advertising-effectiveness determination method according to claim 1, further comprising:
    measuring a call duration of said call; and
    changing a determination result of the effectiveness of said advertisement information based on said received input information if the call duration exceeds a second predefined duration.

7. The advertising-effectiveness determination method according to claim 1, further comprising:
    receiving correction information input into an input equipment other than said calling equipment after the call is finished; and
    determining the effectiveness of said advertisement information based on said correction information input into the input equipment.

8. The advertising-effectiveness determination method according to claim 1, further comprising:
    automatically making a call for prompting said call receiver to input said an input information if the call is finished without an input of said input information.

9. The advertising-effectiveness determination method according to claim 1, further comprising:
    recording a content of said call; and
    determining whether or not to store the recording of the content depending on said input information.

10. The advertising-effectiveness determination method according to claim 1, further comprising:
    charging said call receiver for an advertisement fee resulting from said call; and
    adjusting said advertisement fee based on the effectiveness of said advertisement information.

11. The advertising-effectiveness determination method according to claim 1, further comprising:
    receiving payment information input into a calling equipment of a caller and sent from the calling equipment of the caller before connecting the received call to said call receiver; and
    determining whether or not to execute payment based on the payment information depending on said received input information.

12. An advertising-effectiveness determination system comprising:
    a call connection part configured to receive a call made based on identification information provided to an information-providing medium in association with advertisement information and configured to connect said call to a call receiver indicated by the identification information;
    an input-information receiving part configured to receive input information sent from a calling equipment of the call receiver;
    a deeming part configured to deem that there was an input of a great advertising effectiveness input information if the input-information receiving part does not receive said input information within a first predefined duration; and
    an effectiveness determination part configured to determine an effectiveness of said advertisement information based on the received input information, and the deemed great advertising effectiveness input information if the input-information receiving part does not receive said input information within the first predefined duration.

13. An advertising-effectiveness determination program that causes a computer to perform:

receiving a call made based on identification information provided to an information-providing medium in association with advertisement information;

connecting said call to a call receiver indicated by the identification information;

determining whether input information is received from a calling equipment of the call receiver; and determining an effectiveness of said advertisement information based on:

received input information when said input information is received from the calling equipment when said input information is received within a first predefined duration, and a predefined input information when said input information is not received within the first predefined duration, wherein the predefined input information indicates a high level of advertising effectiveness.

* * * * *